(12) United States Patent
Wong et al.

(10) Patent No.: US 6,423,225 B2
(45) Date of Patent: *Jul. 23, 2002

(54) LIQUID FILTER WITH CENTRIFUGAL SEPARATOR

(75) Inventors: Johnny Wong, Gaston; Willie L. Stamey, Jr., Kings Mountain; Gregory Keith Rhyne, Denver, all of NC (US)

(73) Assignee: Dana Corporation, Toledo, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/398,459

(22) Filed: Sep. 17, 1999

(51) Int. Cl.[7] .......................... B01D 35/22; B01D 27/06
(52) U.S. Cl. ....................... 210/304; 210/306; 210/232; 210/443; 210/DIG. 17
(58) Field of Search ................................. 210/304, 306, 210/440, 443, DIG. 17, 232

(56) References Cited

U.S. PATENT DOCUMENTS

| | | | |
|---|---|---|---|
| 3,078,650 A | | 2/1963 | Anderson et al. |
| 3,272,336 A | | 9/1966 | Humbert, Jr. et al. |
| 3,508,383 A | | 4/1970 | Humbert, Jr. et al. |
| 3,637,078 A | * | 1/1972 | Hollar |
| 3,722,691 A | * | 3/1973 | Francois |
| 4,107,048 A | * | 8/1978 | Darash |
| 4,141,700 A | | 2/1979 | Norton, Jr. et al. |
| 4,162,905 A | * | 7/1979 | Schuler |
| 4,372,762 A | * | 2/1983 | Cooley |
| 4,422,938 A | * | 12/1983 | Miller |
| 4,427,547 A | * | 1/1984 | Miller et al. |
| 4,780,203 A | | 10/1988 | Barcy |
| 5,569,373 A | * | 10/1996 | Smith et al. |
| 5,785,850 A | | 7/1998 | Lynch et al. |

FOREIGN PATENT DOCUMENTS

| | | | |
|---|---|---|---|
| FR | 2693662 | * | 1/1994 |
| JP | 06-058122 | * | 3/1994 |

* cited by examiner

Primary Examiner—Thomas M. Lithgow
(74) Attorney, Agent, or Firm—Millen, White, Zelano & Branigan, P.C.

(57) ABSTRACT

A filter cartridge which removes particulate contaminants from liquids includes an annular filter element which, for example, may be a pleated paper filter element, as well as an array of fins which impart a spiral motion to the liquid prior to the liquid passing through the filter element. The spiral motion imparts a centrifugal force to the particulate contaminants causing heavier filter contaminants to move away from the filter media to proximity with the wall of a housing enclosing the filter media and to subsequently accumulate in an axial space disposed beneath the filter media. Since the filter media does not need to remove particles already precipitated out of the liquid, the life of the filter media is extended, the capacity of the filter media is increased, and the distribution of contaminant particles over the upstream side of the filter media is made more uniform.

3 Claims, 6 Drawing Sheets

LIQUID FILTER WITH CENTRIFUGAL SEPARATOR

FIELD OF THE INVENTION

The present invention relates to liquid filters, and more particularly, the present invention is directed to liquid filters in combination with centrifugal separators.

BACKGROUND OF THE INVENTION

Liquid filters are widely used in machinery such as internal combustion engines to filter various fluids. With internal combustion engines, fuel and lubricating oil are filtered, especially if the internal combustion engine is used to drive a vehicle. Other fluids are also filtered, such as, for example but not limited to, transmission fluid, coolant, hydraulic fluid, various chemical solutions and even drinking water.

In internal combustion engines used in vehicles, there is an overall need to conserve space in engine compartments, and drive train areas, as well as to reduce weight or at least to avoid increases in weight wherever possible. It is also desirable for many reasons to increase filter capacity, extend the life of filter media and where possible, to reduce the amount of area utilized by filter media. It is also highly desirable to provide even flow distribution of particles into the filter media which increases the filter media capacity, increases the life of the filter media and reduces the area consumed by the filter media. These various objectives frequently in conflict with one another and present challenges in the art of filter design.

SUMMARY OF THE INVENTION

It is a feature of the present invention to provide a new and improved liquid filter wherein the capacity and life of the filter media used therein are increased and the amount of area of filter media used is minimized while still providing for an even distribution of particles stopped by the filter media.

In accordance with the present invention, this feature is accomplished by a filter element for filtering a liquid wherein the filter element is adapted to be mounted in a cylindrical housing having a first and second ends wherein the liquid enters the housing through the first end adjacent the filter element and is provided with a rotary motion within the housing by an array of radially projecting fins disposed adjacent the first end of the housing. The array of radially projecting fins are positioned around an annular filter media adapted for mounting in the housing.

In a further aspect of the invention, the fins each have leading and trailing edges and are each canted with respect to the axis of the filter to provide slots therebetween which have inlet and outlet ends, whereby when the liquid enters the first end of the housing, it passes through the slots and the liquid spirals around the filter media prior to passing through the filter media. A still further embodiment of the invention, the housing is oriented vertically, the first end being at the top and the second end at the bottom, whereby as the liquid enters the top of the housing, a spiral motion is imparted to the liquid by the array of fins to participate out relatively heavy particles which thereafter accumulate at the second end of the housing.

DETAILED DESCRIPTION

Figure 1:
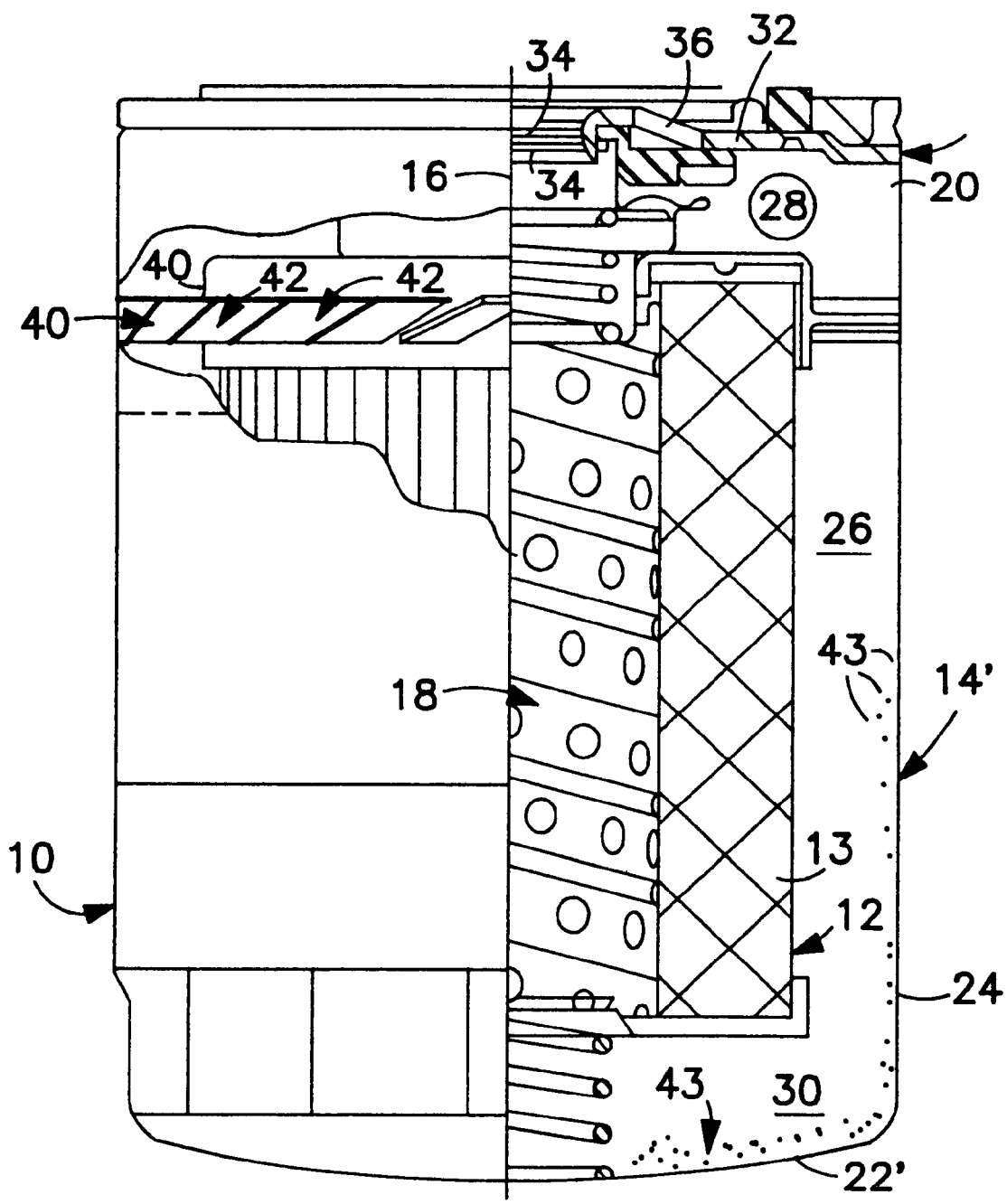
FIG. 1 is a side view partially in elevation illustrating a filter for liquid which includes a centrifugal separator in combination with a filter media.
Figure 2:
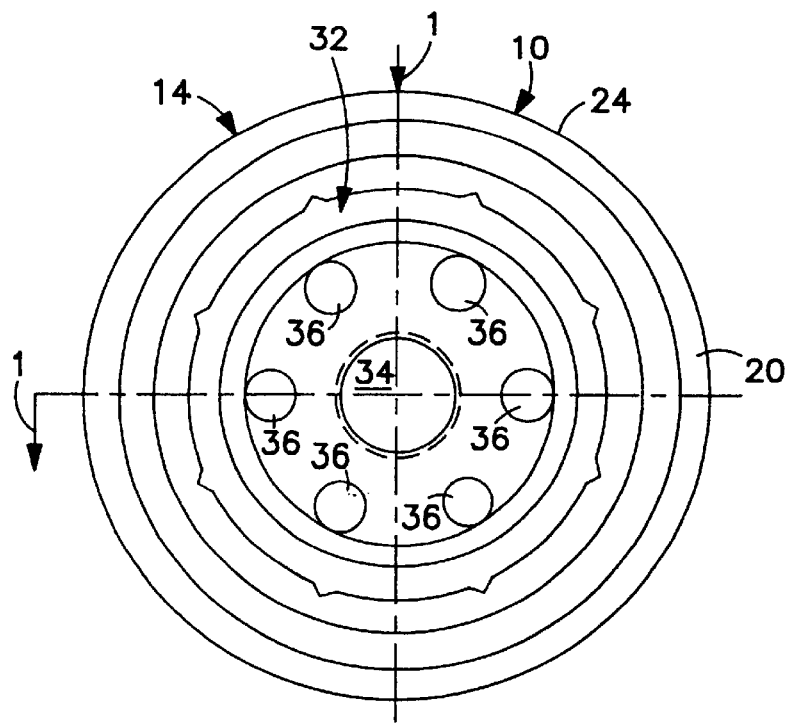
FIG. 2 is an end view of a first or upper end of the filter cartridge shown in FIG. 1.
Figure 3:
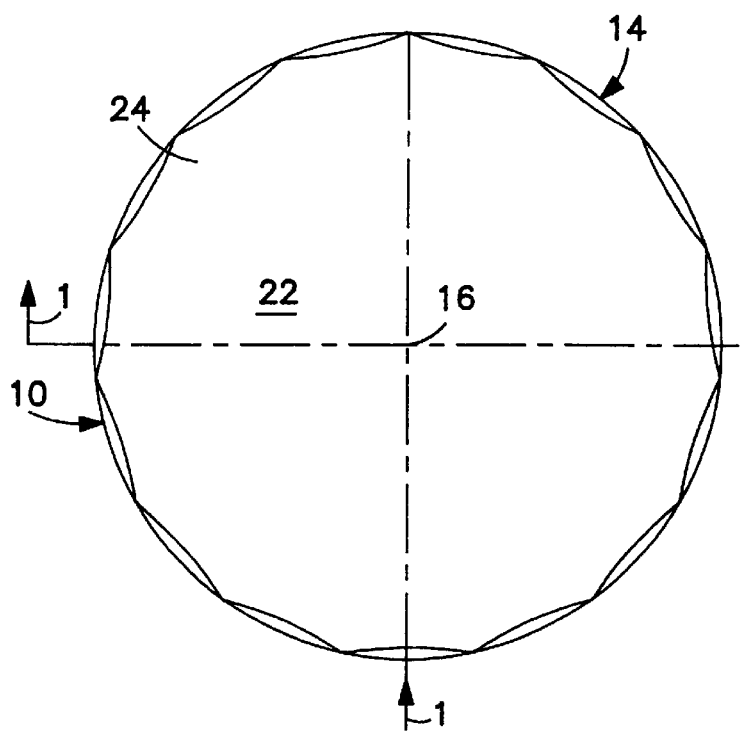
FIG. 3 is an end view of the bottom of the filter cartridge shown in FIG. 1.

Referring now to FIGS. 1–3, there is shown a cartridge 10 for filtering liquids configured in accordance with the present invention, wherein the cartridge comprises an annular filter element 12 configured of a conventional pleated paper filter media 13 or some other filter material, contained within a cylindrical housing 14. The annular filter element 12 is concentric to an axis 16 of the cartridge 10 and has a hollow core 18. The housing 14 of the filter cartridge has a first end 20 and a second end 22, the second end being unitary with a side wall 24 of the housing 14. The side wall 14 of the housing 22 is spaced from the filter media 13 of the filter element 12 by an annular space 26 while the first end 20 of the housing 14 is spaced from the filter element 12 by axial space 28. A second axial space 30 is disposed ; <between the filter element 12 and the second end 22 of the housing 14.

Closing the first end 20 of the housing 14 is a plate 32 having a threaded central outlet 34 and a plurality of spaced inlets 36. Spaced inlets 36 communicate with the first axial end space 30 while the threaded central outlet 34 is in communication with the hollow core 18 of the filter element 12. Accordingly, the liquid to be filtered enters the housing 14 of the canister 10 through the inlets 36 and flows into the first axial space 28. The liquid to be filtered then fills the annular space 26 and the second axial space 30. Since the liquid is under pressure, it then passes through the filter media 13 into the hollow core 18 on the clean side of the filter and exits through the central threaded opening 34.

In accordance with the principles of the present invention, the liquid is caused to rotate around axis 16 as it passes from the first axial space 28 into the annular space 26 by an array 40 of fins 42, which are disposed between the first axial space 28 and the annular space 26. As the liquid rotates, it spirals toward the second end 22 of the housing 14 and as the liquid spirals, centrifugal force is applied to particles 43 entrained in the liquid. The centrifugal force causes the particles 43 to migrate toward the inner surface of the cylindrical wall 24 and to be carried by the spiralling fluid toward the second axial space 30. In the second axial space 30, the particles 43 accumulate on the inner surface of the second end 22 of the housing 14 so as not to impact the filter media 13. If the particles do not impact the filter media 13, they do not become lodged in the filter media and therefore do not clog the filter media.

As is seen in FIG. 1, the filter cartridge 10 is oriented with the axis 16 extending at least substantially vertically so that gravity keeps the particles 43 which have accumulated at the second end 22 of the housing 14 in the second axial space 30 when the machine or engine is at rest. When the engine or machine is running so that the liquid is circulating around the filter media 13, heavy particles are continually encouraged by centrifugal force to migrate toward the inner surface of the cylindrical wall 24 and thus to settle in the axial space 30 at the lower end of the housing.

Figure 4:
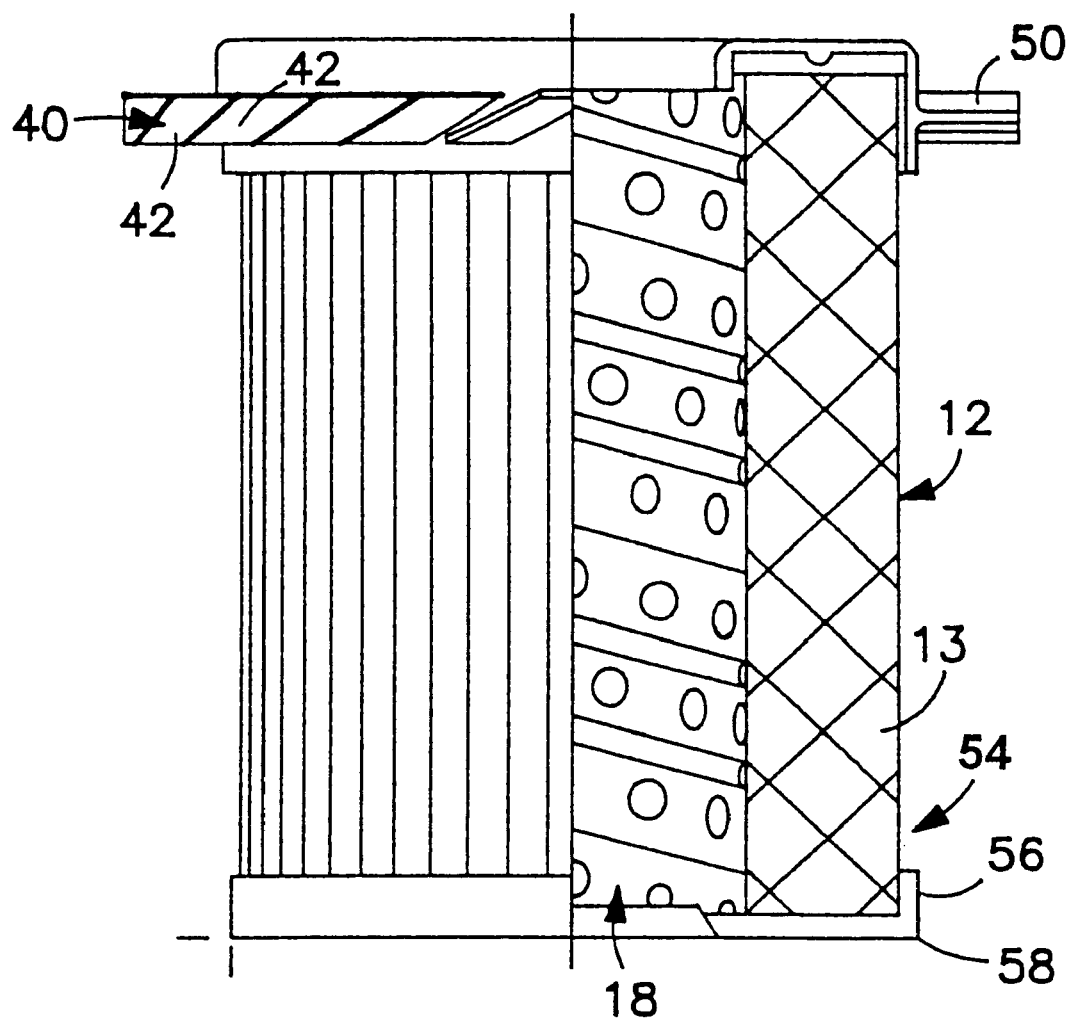
FIG. 4 is a side view, partially in elevation showing the filter element used in the filter cartridge of FIGS. 1–3.
Figure 5:
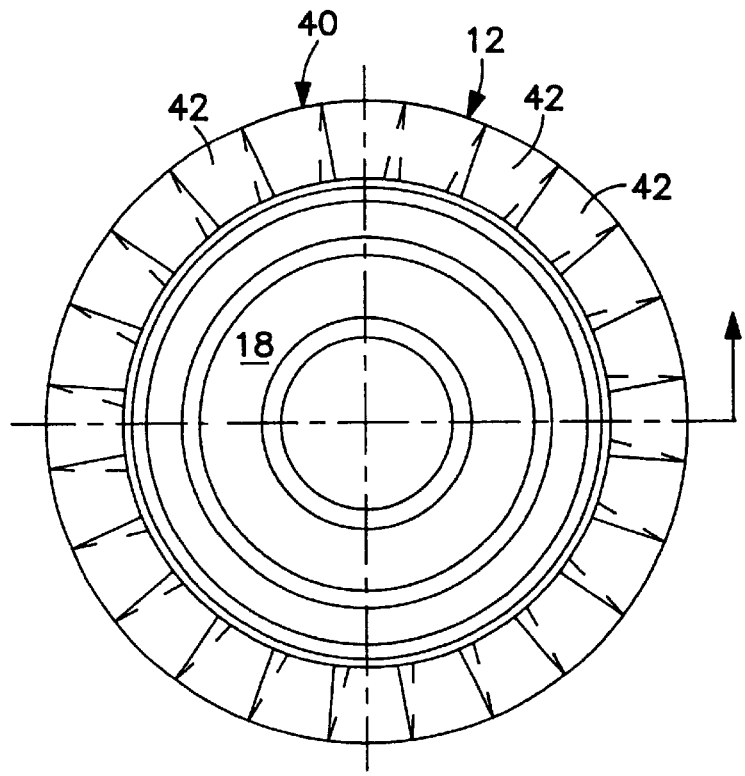
FIG. 5 is a top view of the filter element of FIG. 4.
Figure 6:
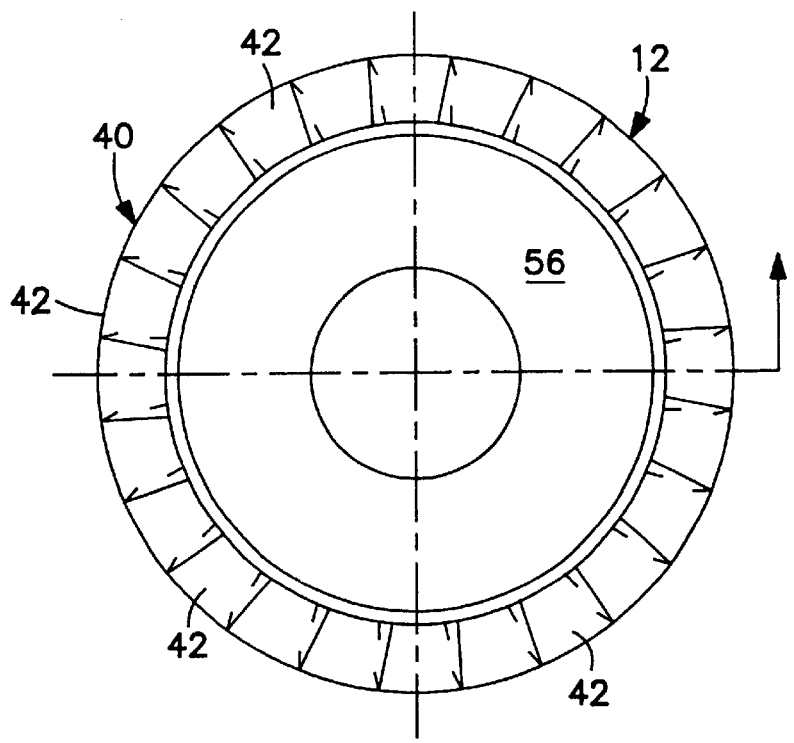
FIG. 6 is a bottom view of the filter element of FIG. 4.
Figure 7:
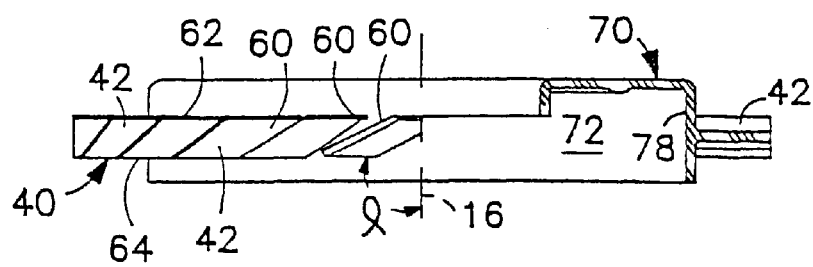
FIG. 7 is a side view, partially in section, of a fin array configured for attachment to the filter element of FIGS. 4–6.

Referring now to FIGS. 4, 5 and 6, when the filter element 12 is removed from the housing 14, it is seen that the filter element has the fin array 40 integral therewith so that the center of the housing 14 including the end plate 32 can be a currently used housing with no modification. In the filter element 12 used in FIG. 4, the fin array 40 is mounted on the second end of the filter media 13 by being adhered to to plastisol seal 50 that seals the first end 52 of the filter media. The second end 54 of the filter media 13 is sealed by a layer of plastisol 56 which adheres a dished circular end cap 58 to the filter media so as to close both the second end of the filter media and the hollow core 18. Consequently, when the filter element 12 is mounted in the housing with the open end of the hollow core in communication with the threaded central opening 34, all of the fluid within the housing 14 must flow through the filter media 13 before exiting from the canister 10.

Referring now to FIGS. 7–10 where the fin array 40 is shown separate from the filter element 12, it is seen that the fin array is comprised of a plurality of radially extending fins 42 which are canted at the angle a with respect to the axis 16 of the canister 10 and the filter media 13. Since the fins 42 are both canted and spaced from one another, they define canted slots 60 therebetween which slots extend between downstream edges 62 and upstream edges 64. When liquid under pressure flows from the inlets 36 into the first annular space 28, the liquid under pressure necessarily is given a circular component as the liquid flows through the slots 60 into the annular space 26. Preferably, each fin 42 has a free edge 66 which engages the inner surface of wall 24 or is in close proximity to that surface.

Figure 8:
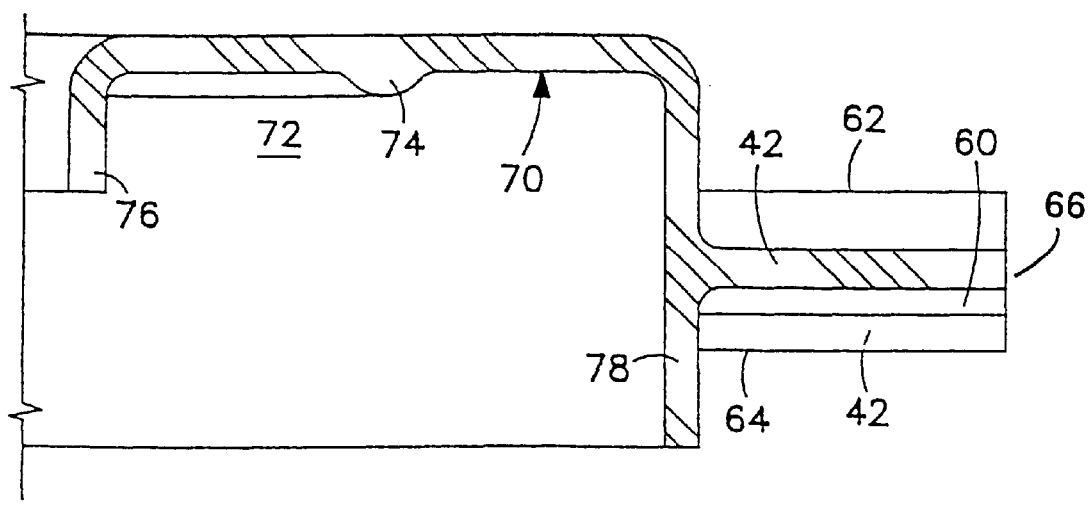
FIG. 8 is an enlarged side view of a section of the fin array of FIG. 7 showing a single fin.
Figure 9:
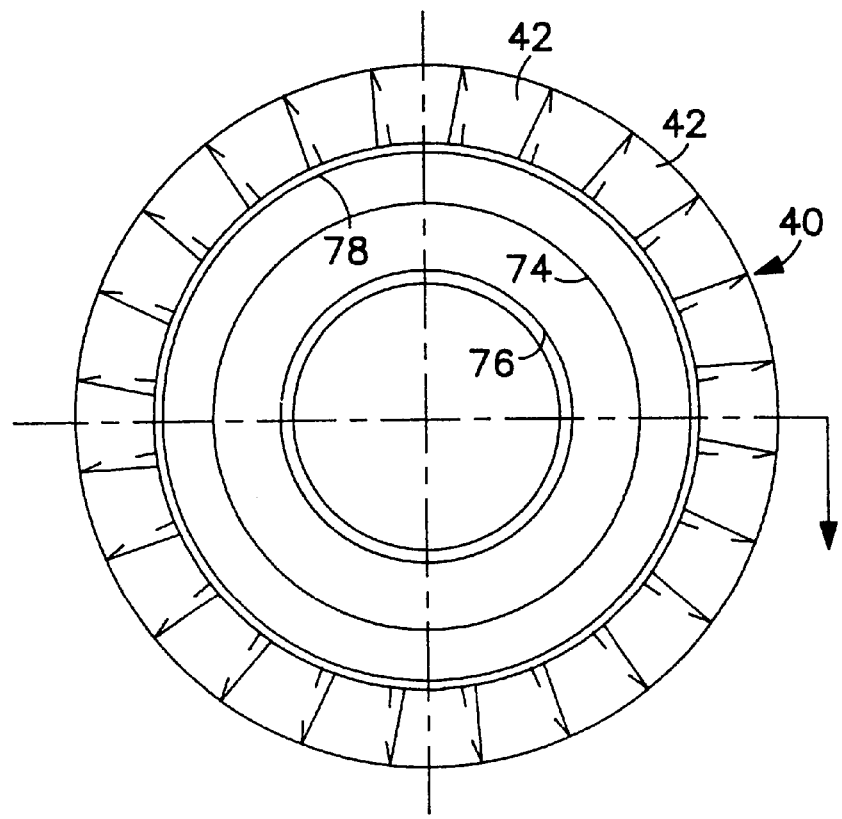
FIG. 9 is a top view of the fin array of FIG. 7.
Figure 10:
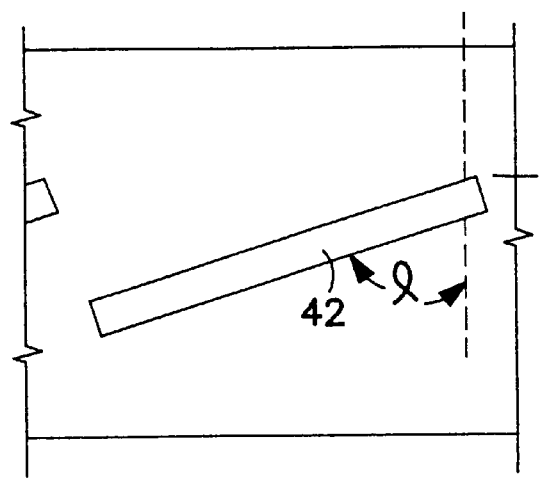
FIG. 10 is a side view showing a single fin and a portion of a base upon which the fin is mounted.

As is best seen in FIG. 8, the filter array 40 has a base 70 with a channel shaped portion 72. The channel shaped portion 72 encloses the first end 52 of the filter media 12 with a stabilizing rib 74 that beds in the layer of plastisol 52 (see FIGS. 1 and 4). The channel 72 has an inner axially extending wall 76 and an outer axially extending wall 78 wherein the inner axially extending wall 76 extends into the hollow core 18 of the filter media 13 (see FIGS. 1 and 4) while the outer wall 78 forms a base for supporting the fins 42.

In accordance with a second embodiment of the invention, the filter array 40 can be snap-fitted over the second end 52 of the filter media 13 of the filter element 12. This is accomplished by molding the filter array 40 of resilient plastic material so that it frictionally retains itself around the filter media or has detents which engage an axial abutment with corresponding surfaces of the filter element 12 or filter media.

While the fin array 40 is a preferable configuration for the device to make the liquid flowing into the canister 10 spiral around the filter media 13, other arrangements may be utilized to accomplish this. For example, the inlets 36 could have tubes which have openings facing in a tangential or circumferential direction with respect to the axis 16 so that the liquid enters the canister swirling in the same direction to impart centrifugal force to particles within the liquid. It is also possible to have the fins 42 to project radially inwardly from cylindrical wall 24 and be attached to the wall rather than being attached to the filter element 12 in order to cause a spiral motion in the liquid.

At the present time, the preferred arrangement does provide a convenient way to mount the fins 42 because very little, if any, manufacturing steps need be changed other than the assembly step of sliding the fin array 40 over the first end 52 of the filter media 13.

By the foregoing arrangement, the capacity of the filter cartridge 10 is increased and the filter media usage is expanded without adding additional filter media material.

The liquid being filtered and cleared of particulate contamination may be lubricating oil, fuel, coolant, hydraulic fluid, transmission fluid, or other liquids used for various purposes and various types of machines and engines.

From the foregoing description, one skilled in the art can easily ascertain the essential characteristics of this invention, and without departing from the spirit and scope thereof, can make various changes and modification of the invention to adapt it to various usages and conditions.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

We claim:

1. A disposable filter for filtering lubricating oil used in an internal combustion engine, comprising:

an annular filter element having first and second ends;

a permanently closed cylindrical housing containing the annular filter element, the cylindrical housing having first and second ends and a wall with an annular space between the wall and the filter element, with the first end adapted to be an upper end and the second end adapted to be a lower end, the cylindrical housing also having an end plate permanently affixed thereto with a central spin-on lubricating oil outlet and a plurality of radially positioned spaced apart lubricating oil inlets therethrough, wherein the liquid enters the cylindrical housing through the lubricating oil inlets adjacent the first end of the filter element and flows into the annular space;

the filter element including an annular pleated paper filter media having a first end and a second end, the first end being located adjacent the first end of the housing and being covered with a resinous material and the second end being located adjacent to the second end of the housing, and an annular array of radially projecting fins disposed around the filter element in the annular space between the wall and the filter element at a location adjacent to the first end of the housing, the fins each having leading and trailing edges each being canted with respect to the axis of the filter to provide slots therebetween which have inlet and outlet ends wherein when the lubricating oil passes through the lubricating oil inlets and enters the first end of the housing and then passes through the slots between the fins, the lubricating oil spirals around the filer media prior to passing through the filter media causing particulates in the lubricating oil migrate under centrifugal force away from the filter media and move toward the second end of the housing for accumulation away from the filter media, the array of fins being mounted on an annular base which is secured around the filter media and adhered to the resinous material.

2. A disposable filter for filtering lubricating oil used in an internal combustion engine, comprising:

an annular filter element having first and second ends;

a permanently closed cylindrical housing containing the annular filter element, the cylindrical housing having first and second ends with the first end adapted to be an upper end and the second end adapted to be a lower end, and a wall with an annular space between the wall and the filter element, the cylindrical housing also having an end plate permanently affixed thereto with a central spin-on lubricating oil outlet and a plurality of radially positioned spaced apart lubricating oil inlets therethrough, wherein the liquid enters the cylindrical housing ,through the lubricating oil inlets adjacent the first end of the filter element and flows into the annular space;

the filter element including an annular pleated paper filter media having a first end and a second end, the first end being located adjacent the first end of the housing and the second end being located adjacent to the second end of the housing, and an annular array of radially projecting fins disposed around the filter element in the annular space between the wall and the filter element at a location adjacent to the first end of the housing, the fins each having leading and trailing edges and each being canted with respect to the axis of the filter to provide slots therebetween which have inlet and outlet ends wherein when the lubricating oil enters the first end of the housing through the slots, the lubricating oil spirals around the filter media prior to passing through the filter media causing particulates in the lubricating oil to migrate under centrifugal force away from the filter media and move toward the second end of the housing for accumulation away from the filter media, the array of fins being mounted on an annular base, which annular base includes a snap fit coupling for securing the array of fins to the first end of the filter media.

3. The filter element of claim 2, wherein the array of fins, and annular base are molded of plastic as a unit.

* * * * *